United States Patent [19]

Roberts

[11] 4,307,921
[45] Dec. 29, 1981

[54] SLEEVE BEARING

[75] Inventor: Arden J. Roberts, Warren, Mich.

[73] Assignee: Federal-Mogul Corporation, Southfield, Mich.

[21] Appl. No.: 153,249

[22] Filed: May 27, 1980

[51] Int. Cl.³ .......................... F16C 9/04; F16C 33/10
[52] U.S. Cl. .................................... 308/122; 308/240
[58] Field of Search .................. 308/23, 121, 122, 240

[56] References Cited

U.S. PATENT DOCUMENTS

| | | | |
|---|---|---|---|
| 3,172,304 | 3/1965 | Robertson | 308/122 |
| 3,201,183 | 8/1965 | Buske | 308/240 |
| 3,625,580 | 12/1971 | De Hart et al. | 308/240 |
| 3,743,367 | 7/1973 | Raimondi | 308/122 |
| 3,801,173 | 4/1974 | McKindree | 308/240 |
| 4,073,550 | 2/1978 | Yahraus | 308/23 |
| 4,235,481 | 11/1980 | Fukuoka et al. | 308/122 |

FOREIGN PATENT DOCUMENTS 2723585 12/1977 Fed. Rep. of Germany ........ 308/23

Primary Examiner—Richard R. Stearns
Attorney, Agent, or Firm—William G. Coon

[57] ABSTRACT

A sleeve bearing for a split-angle connecting rod having a bearing surface including two opposed portions wherein the first portion is concentric with the journaled member during the loaded portion of a revolution and is defined by a constant radius which closely approximates the radius of the journaled member to provide a relatively small clearance with the journaled member and the second portion is eccentric with respect to the journaled member and is defined by at least one radius to provide a greater clearance with the journaled member.

22 Claims, 4 Drawing Figures

SLEEVE BEARING

BACKGROUND OF THE INVENTION

This invention relates to sleeve bearings of the type having an oil film or layer between the bearing surface and a journaled member. The invention is particularly applicable to half-shell sleeve bearings used in internal combustion engines in cooperation with crankshafts and connecting rods. However, it will be appreciated that the invention has broader applications and may be used in other environments of this general type.

Engine main and connecting rod bearings in internal combustion engines are subjected to repetitive loads which can ultimately fatigue the bearing. These bearings are disposed in a continuously circulated oil bath and there is a clearance provided between the outer peripheral surface of the journaled member or crankshaft and the inner peripheral bearing surface of the sleeve bearing. This facilitates relative rotation between the parts during normal engine operation and facilitates the creation of an oil film between the parts which acts as a load supporting medium during engine operation. The hydrodynamic wedge effect of the oil causes the shaft or journaled member to float on an oil film as a result of there being a difference between the shaft and bearing radii, i.e., a clearance. The oil in the clearance provides lubrication and cooling. It has been shown that the oil film pressure developed in such bearings increases with increased bearing clearance. Bearings exposed to higher pressures fatigue sooner or to a greater extent than bearings exposed to lower pressures. A greater clearance provides a greater oil film pressure and a greater oil film pressure causes the bearing to fatigue faster. It seemingly would be a mere matter of reducing the oil film clearance to reduce the oil film pressure to increase the bearing life. The clearance cannot simply be reduced, however, as that would reduce the lubrication and cooling causing the bearing to run hotter and possibly burn up during operation.

The subject invention provides an improved sleeve bearing having a bearing surface with a first portion extending circumferentially on a constant radius which would be in close clearance or reduced clearance with the journaled member and having a second circumferential portion disposed outside the constant radius to provide a greater clearance. The bearing area of the reduced clearance is in close proximity to the journaled member during the high load portion of each revolution.

SUMMARY OF THE INVENTION

A sleeve bearing having an outer cylindrical surface and an inner bearing surface for surrounding a cylindrical journaled member in close spaced relationship therewith in a manner defining a clearance space with the journaled member to receive lubricant. The bearing surface has a first portion extending circumferentially between spaced ends on a constant radius which closely approximates the radius of the journaled member so that the first portion is substantially concentric with the journaled member when closely in engagement therewith during the loaded portion of a revolution. The bearing surface includes a second portion extending circumferentially outside the constant radius and joining the first portion at the spaced ends thereof on the constant radius.

PRIOR ART STATEMENT

There are known sleeve bearings with a portion of the bearing surface having a radius nearly equal to the radius of the journaled member so as to reduce the clearance during the high load portion of the bearing cycle to reduce oil film pressure and a second portion with a greater clearance. An example of such a bearing is shown in U.S. Pat. No. 4,073,550 granted Feb. 14, 1978 to William A. Yahraus. In that bearing assembly the sleeve bearing is made of two half-shells with one of the half-shells having a radius which closely approximates the radius of the journaled member to reduce clearance and with the second half-shell having a bearing surface of a greater radius to increase clearance. That sleeve bearing must be fabricated from two different half-shells and is subjected to wear at the juncture between the half-shells where there is a step, as the bearing surfaces do not coincide. Another sleeve bearing having a second portion of the bearing surface for clearance is illustrated in U.S. Pat. No. 3,625,580 granted Dec. 7, 1971. That bearing, however, includes two opposed portions of the bearing surface which are concentric to the journaled member and because a given diametrical clearance is required in a bearing sleeve, both of these opposed surfaces must contribute to that total diametrical clearance whereby there is a limit in the reduction of such clearances.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
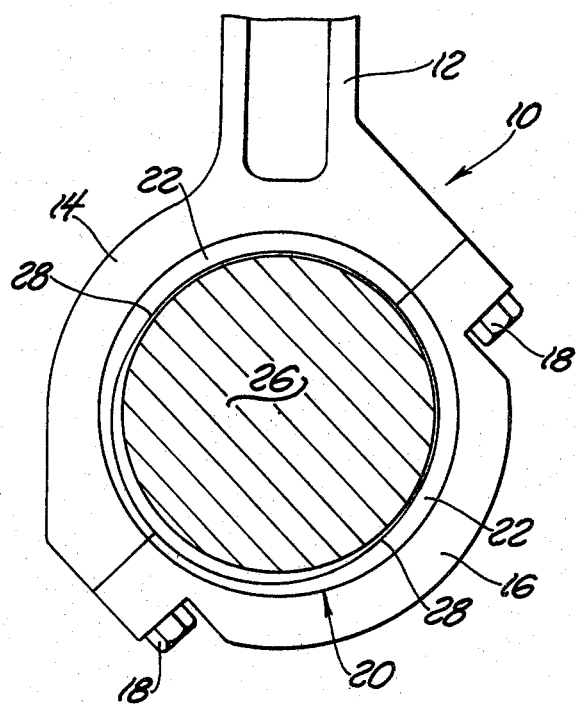
FIG. 1 is a fragmentary elevational view of a split-angle end rod assembly incorporating the bearing of the subject invention.
Figure 2:
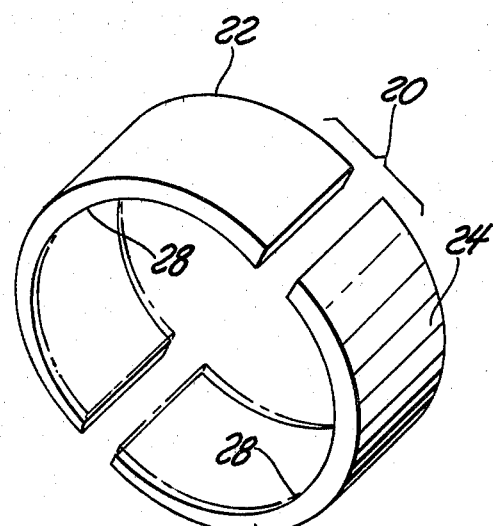
FIG. 2 is a perspective view of the sleeve bearing of the subject invention.
Figure 3:
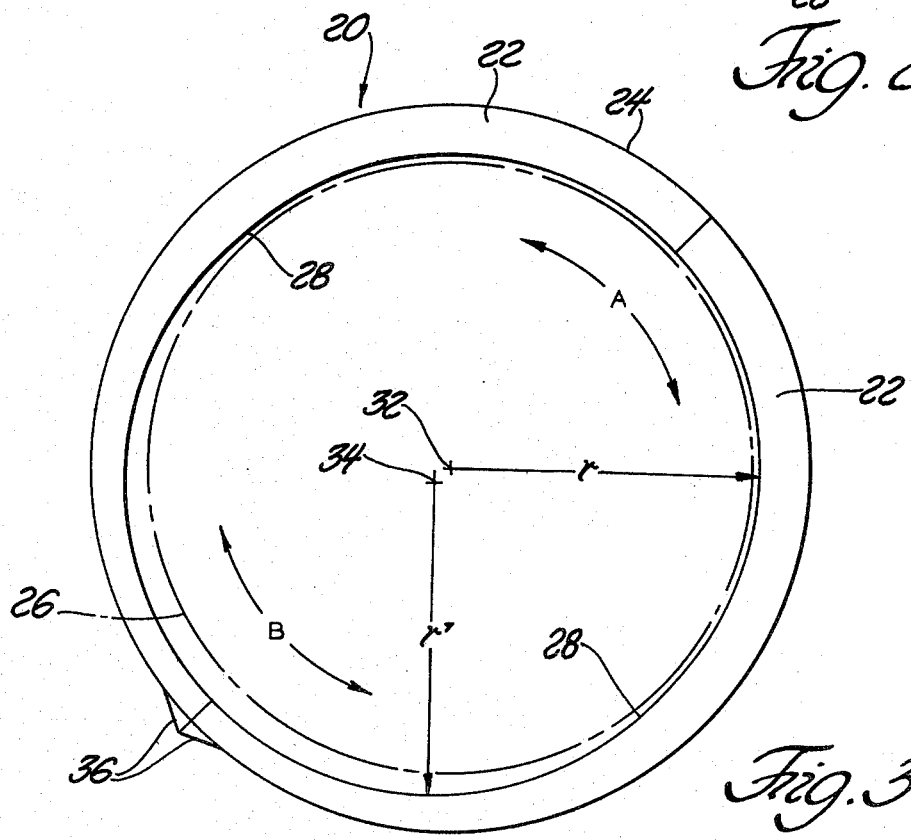
FIG. 3 is an enlarged side view of one embodiment of the sleeve bearing of the subject invention.

A split-angle end rod assembly is generally shown at 10. The assembly 10 includes an elongated rod 12 having a longitudinal axis and integral with an upper bearing housing 14. A separate lower bearing housing 16 is included and is connected to the upper bearing housing 14 by fastening means comprising the bolts 18. The bolts 18 extend through the lower bearing housing 16 and threadedly engage the upper bearing housing 14 to secure the two housings 14 and 16 together whereby the housings 14 and 16 define a circular bearing pocket. Each of the housings 14 and 16 provide one-half of the circular circumference of the bearing pocket. The housings 14 and 16 mate on a diameter which is disposed on or at an acute angle relative to the longitudinal axis of the rod 12.

A sleeve bearing generally shown at 20 is disposed in the circular bearing pocket defined by the housings 14 and 16. The bearing 20 is made of two half-shells 22 and has an outer cylindrical surface 24 engaging the bearing pocket defined by the housings 14 and 16. The sleeve bearing 20 includes an inner bearing surface surrounding a cylindrical journaled member 26 in close spaced relationship therewith in a manner defining a clearance space with the journaled member to receive lubricant.

The inner bearing surface has a circular first portion extending circumferentially as generally indicated at A on a constant radius r between the spaced ends or points 28. The bearing surface includes a second portion extending circumferentially as generally indicated by B and is disposed outside the constant radius r and joins the first portion at or on the constant radius at the spaced ends or points 28. Each of the half-shells 22 includes one-half of each of the first and second bearing portions between the points 28. As illustrated in FIG. 1, one of the half-shells 22 is disposed in the bearing housing 14 and the other half-shell 22 is disposed in the bearing housing 16. The second bearing portion generally indicated at B extends circumferentially on a constant radius r'. The constant radius r of the first portion A extends about a first axis 32 and the constant radius r' of the second portion B extends about a second or reference axis 34. The axes 32 and 34 are spaced from one another and are disposed on the diameter which divides the first and second portions A and B in half. In other words, the axes 32 and 34 are on the diameter which divides the first and second portions A and B and divides the half-shells 22, the half-shells being semi-circular. The axes 32 and 34 are on the diameter along which the half-shells 22 mate. The constant radius r' of the second portion B is not less than the length of the constant radius r of the first portion A. In other words, the radius r' is not less than the radius r, although it is preferably greater.

The bearing surface on the constant radius r extending generally over the area A between the ends or points 28 closely approximates the radius of the journaled member 26, that is, there is very small clearance between the journaled member 26 and the bearing surface on the constant radius r. The bearing surface on the constant radius r is concentric with the outer cylindrical surface 24 of the sleeve and will, therefore, be nearly concentric with the journaled member 26. However, the second bearing portion on the radius r' generally indicated at B and extending between the ends or points 28 is eccentric with respect to the outer cylindrical surface 24 thereby providing a greater clearance between the journaled member and the sleeve bearing over the bearing surface B.

The half-shells 22 are identical to one another, as they each include a bearing surface extending 180° with a first portion A extending circumferentially on the constant radius r and a second portion extending the remainder of the circumference and disposed outside the constant radius r with the two bearing surface portions A and B meeting at point 28 in each half-shell which is on the constant radius r.

The arc over which the bearing portion A extends may vary but is preferably less than 180° in the sleeve bearing. In other words, the bearing portion A in each half-shell extends circumferentially less than 90° and the bearing portion B extends greater than 90°.

Each of the half-shells 22 includes a locating projection 36, as is well known in the art.

As will be appreciated, the bearing surface portion on the constant radius r provides a very close clearance with the journaled member 26 during the loaded portion of each revolution to maintain a very thin oil film to reduce oil film pressure and thereby increase resistance to bearing fatigue. However, the second portion of the bearing surface on the radius r' extending generally over the area B between points 28 is outside the radius r or is eccentric to provide greater clearance to provide the proper oil flow through the bearing to control the bearing temperature. The two bearing surfaces meet at point 28 which is on the constant radius r to provide a smooth transition between the bearing surface portions. Thus, the sleeve bearing is made of two identical half-shells which reduce clearance and, consequently, oil film pressure during the loaded portion of each revolution but because of the eccentrically disposed bearing portion B the normal clearance is provided to provide the required oil flow.

Figure 4:
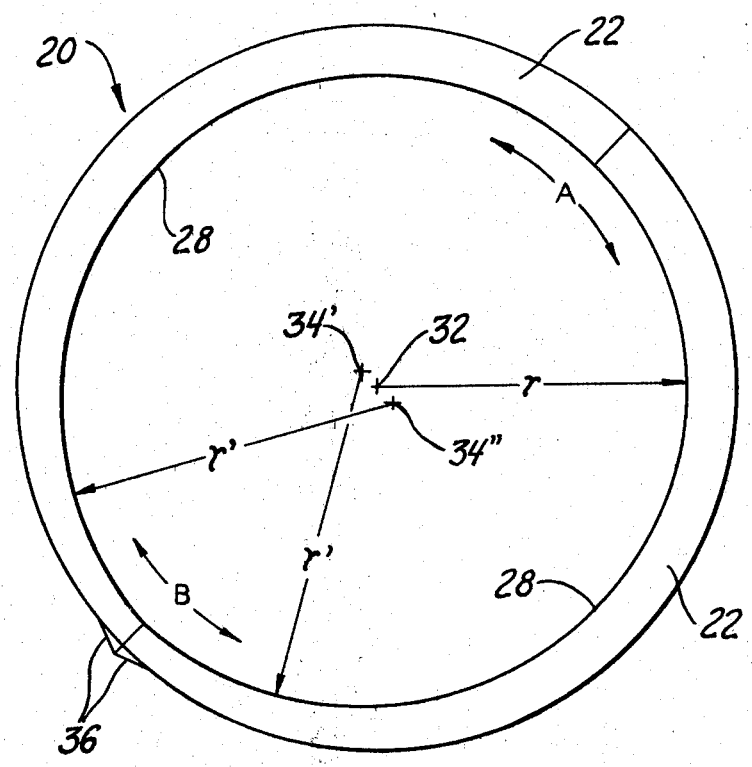
FIG. 4 is an enlarged side view of another embodiment of the sleeve bearing of the subject invention.

The embodiment shown in FIG. 4 incorporates the features and provides the advantages discussed above in connection with the first embodiment. The embodiment of FIG. 4 differs from the first described embodiment only in that the entirety of the second portion B in the first embodiment extends about the reference axis 34 on the constant radius r', whereas in the embodiment of FIG. 4 the second portion B on one side of the dividing diameter extends on the constant radius r' about a first reference axis 34' and on the other side of the diameter extends on the constant radius r' about a second reference axis 34''. The first and second reference axes 34' and 34'' are spaced from one another and from the first axis 32. Also, the first and second axes 34' and 34'' are equally spaced on opposite sides of the dividing diameter. In other words, the half-shells in FIG. 4 are identical to one another as the orientation or disposition of the first reference axis 34' relative to its half-shell is exactly the same as that of the second reference axis 34'' to its half-shell.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claim wherein reference numerals are merely for convenience and are not to be in any way limiting, the invention may be practiced otherwise than as specifically described.

The embodiments of the invention in which an exclusive property or privilege is claimed are defined as follows:

1. A sleeve bearing (20) having an outer cylindrical surface (24) and an inner bearing surface for surrounding a cylindrical journaled member (26) in close spaced relationship therewith in a manner defining a clearance space with the journaled member (26) to receive lubricant, said inner bearing surface having two opposed portions (A) and (B) wherein the first portion (A) is concentric with the journaled member (26) during the loaded portion of a revolution and is defined by a constant radius (r) which closely approximates the radius of the journaled member (26) to provide a relatively small clearance with the journaled member (26) and the second portion (B) is eccentric with respect to the journaled member (26) and is defined by at least one radius to provide a greater clearance with the journaled member (26).

2. A bearing as set forth in claim 1 wherein said second portion (B) of said bearing surface extends circumferentially in a circular path defined by a constant radius (r').

3. A bearing as set forth in claim 2 wherein said circular first portion (A) extends about a first axis (32) on said constant radius (r).

4. A bearing as set forth in claim 3 wherein said constant radius (r') is not less than said constant radius (r) of said first portion (A).

5. A bearing as set forth in claim 4 wherein said first axis (32) is located on a diameter which divides each of said first (A) and second (B) portions in half.

6. A bearing as set forth in claim 5 wherein said sleeve bearing (20) comprises a pair of semi-circular half-shells (22).

7. A bearing as set forth in claim 6 wherein said half-shells (22) engage one another on said diameter which divides each of said first (A) and second (B) portions so that said half-shells (22) are identical.

8. A bearing as set forth in claim 7 wherein said first portion (A) is concentric with said outer cylindrical surface (24) and said second portion (B) is eccentric with said outer cylindrical surface (24).

9. A bearing as set forth in claim 8 wherein the entirety of said second portion (B) extends about a reference axis (34) on said constant radius (r').

10. A bearing as set forth in claim 9 wherein said first and reference axes (32, 34) are spaced from one another.

11. A bearing as set forth in claim 10 wherein said reference axis (34) is also located on said diameter.

12. A bearing as set forth in claim 8 wherein said second portion (B) on one side of said diameter extends about a first reference axis (34') on said second constant radius (r') and on the other side of said diameter extends about a second reference axis (34") on said second constant radius (r').

13. A bearing as set forth in claim 12 wherein said first and second reference axes (34', 34") are spaced from one another and from said first axis (32).

14. A bearing as set forth in claim 13 wherein said first and second reference axes (34', 34") are equally spaced on opposite sides of said diameter.

15. A bearing as set forth in claim 1 wherein said sleeve (20) comprises a pair of semi-circular half-shells (22), each of said half-shells (22) defining one-half of each of said first (A) and second (B) portions so that said half-shells (22) are identical.

16. A bearing as set forth in claim 15 wherein said first portion (A) is concentric with said outer cylindrical surface (24) and said second portion (B) is eccentric with said outer cylindrical surface (24).

17. A sleeve bearing half-shell (22) having an outer cylindrical surface (24) and an inner bearing surface for engaging a journaled member (26), said bearing surface extending 180° and consisting of a first portion (A) beginning at one parting face and extending circumferentially on a first constant radius (r) for a part of the 180° and a second portion (B) generated about a single eccentric point (34,34') beginning at the other parting face and extending circumferentially outside said constant radius (r) for the remainder of the 180° and joining said first portion (A) on (28) said constant radius (r).

18. A sleeve bearing half-shell as set forth in claim 17 wherein said first portion (A) is concentric with said outer cylindrical surface (24).

19. A sleeve bearing half-shell as set forth in claim 18 wherein said second portion (B) extends circumferentially on a second constant radius (r') which is not less than said first constant radius (r) of said first portion (A).

20. A sleeve bearing half-shell as set forth in claim 19 wherein said second portion (B) is eccentric to said outer cylindrical surface (24).

21. A sleeve bearing half-shell as set forth in claim 17 wherein said first portion (A) extends circumferentially less than 90° and said second portion (B) extends circumferentially greater than 90°.

22. A split-angle end rod assembly (10) comprising: an elongated rod (12) having a longitudinal axis and integral with an upper bearing housing (14), a separate lower bearing housing (16), fastening means (18) for securing said housings (14; 16) together to define a circular bearing pocket, each of said housings (14; 16) providing one-half of the circular circumference of said pocket, said housings (14; 16) mating on a diameter which is disposed on an acute angle relative to said longitudinal axis of said rod (12), a sleeve bearing (20) disposed in said pocket, said sleeve bearing (20) having an outer cylindrical surface (24) engaging said pocket and an inner bearing surface for surrounding a cylindrical journaled member (26) in close spaced relationship therewith in a manner defining a clearance space with the journaled member (26) to receive lubricant, said bearing surface having two opposed portions (A) and (B) wherein the first portion (A) is concentric with the journaled member (26) during the loaded portion of a revolution and the second portion (B) is eccentric with respect to the journaled member (26), said first portion (A) extending circumferentially between spaced ends (28) on a constant radius (r) which closely approximately the radius of the journaled member (26) to provide a relatively small clearance with the journaled member (26) and said second portion (B) extending circumferentially outside said constant radius (r) and joining said first portion (A) at said spaced ends (28) on said constant radius (r), said sleeve bearing (20) comprising two half-shells (22), with each of said half-shells (22) including one-half of each of said first (A) and second (B) portions, one of said half-shells (22) being disposed in one bearing housing (14) with the other half-shell (22) disposed in the other bearing housing (16).

* * * * *